Figure 1:
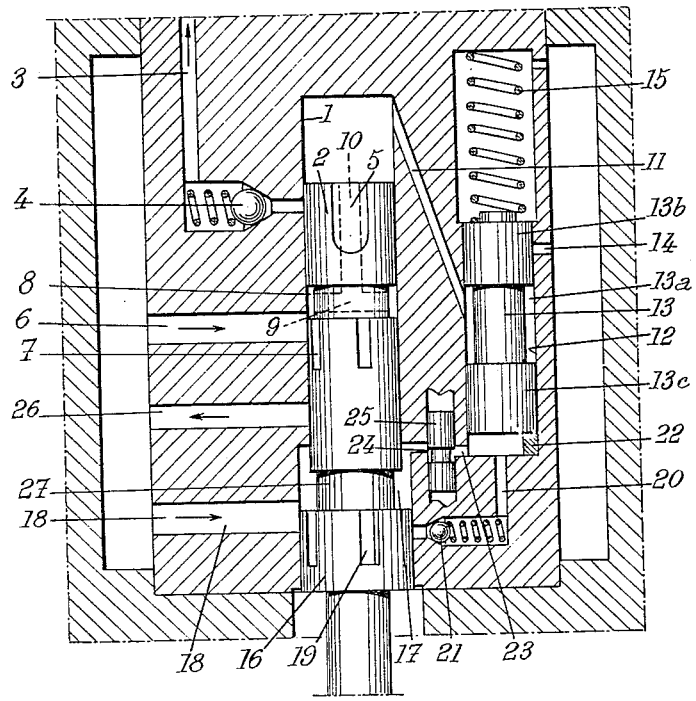

May 28, 1963

P. E. BESSIERE 3,091,180

SELF REGULATING RECIPROCATING PUMPS IN PARTICULAR
FOR THE INJECTION OF FUEL INTO ENGINES

Filed May 17, 1962

INVENTOR
PIERRE ETIENNE BESSIERE

BY
Bailey, Stephens & Huettig
ATTORNEYS

United States Patent Office 3,091,180
Patented May 28, 1963

3,091,180
SELF REGULATING RECIPROCATING PUMPS IN PARTICULAR FOR THE INJECTION OF FUEL INTO ENGINES
Pierre Etienne Bessiere, 55 Boulevard du Commandant Charcot, Neuilly-sur-Seine, France
Filed May 17, 1962, Ser. No. 195,579
Claims priority, application France May 26, 1961
3 Claims. (Cl. 103—41)

The present invention relates to self-regulating reciprocating pumps, in particular for the injection of fuel into engines, self-regulation being obtained by means of a regulating member having outward and return strokes and which controls a by-pass conduit leading off from the pump working chamber.

In such pumps the outward strokes of the regulating member, that is to say that the displacement of this member toward the position in which it opens the outlet of the by-pass conduit, are produced by a liquid flowing through an auxiliary hydraulic circuit, independent of the main liquid circuit (i.e. that through which flows the liquid to be fed by the pump), whereas the return strokes of said regulating member take place under the action of a return force. The auxiliary circuit comprises a reciprocating auxiliary pump, the piston of which moves in synchronism with the main pump piston and which delivers, during every delivery stroke of the main pump piston, a given amount of liquid to produce the corresponding outward stroke of the regulating member. In order to obtain the desired self-regulation, the auxiliary circuit further comprises a passage which varies the length of the strokes of the regulating member in accordance with the speed at which the main piston and the auxiliary piston are driven which speed (indicated in the form of the number of reciprocations per minute of said pistons) is proportional to the number of revolutions per minute of the engine on which the pump is mounted, if this pump is a fuel injection pump. Preferably the throttled passage serves to brake the return strokes of the regulating member and is therefore disposed in the conduit through which the regulating member, between two delivery strokes of the main piston, drives back, during its own return stroke, at least a portion of the liquid which has produced its preceding outward stroke, at the end of which said member had opened the by-pass conduit outlet. Thus for speeds of a pump above a given value as so called "liquid abutment" effect takes place, which is such that the by-pass conduit is opened the earlier during every delivery stroke of the main pump piston as this speed exceeds said given value by a greater amount.

In order to obtain an accurate self regulation, the quantity of liquid delivered toward the regulating member by the auxiliary pump, during every delivery stroke thereof, must be always the same. Furthermore when self regulation is based upon the "liquid abutment" effect the angular value of the regulating member return period (i.e. of the period between the time when the regulating member starts on its return stroke and the time when it is pushed back in the outward direction by the liquid delivered by the auxiliary pump) must also be constant. The term "angular value" of this period means the angle of rotation, during this period, of the cam shaft which drives the pump, or of the shaft of the engine on which the pump is mounted. Now it results from experience that both said amount of liquid delivered by the auxiliary pump and the angular value of said return period may vary, for instance as a consequence of a temperature variation producing an expansion of some parts of the pump, such as its frame, or as a consequence of mechanical compression between the pump piston and its driving cam.

The object of the present invention is to eliminate this drawback by making both the amount of liquid delivered, by the auxiliary pump on every stroke thereof and the angular value of said return period independent of possible deformation of the auxiliary pump.

For this purpose, according to my invention, either the auxiliary pump or a part rigid with this piston is made to control, not only, as it was known, an inlet conduit provided in the pump body and serving to the feed of liquid to the auxiliary cylinder so that closing of this conduit at the beginning of every delivery stroke of the auxiliary pump piston starts the feed of liquid under pressure to the regulating member, but also a by-pass conduit also provided in the pump body, so as to open this by-pass conduit before the auxiliary piston pump reaches the end of its delivery stroke.

Figure 2:
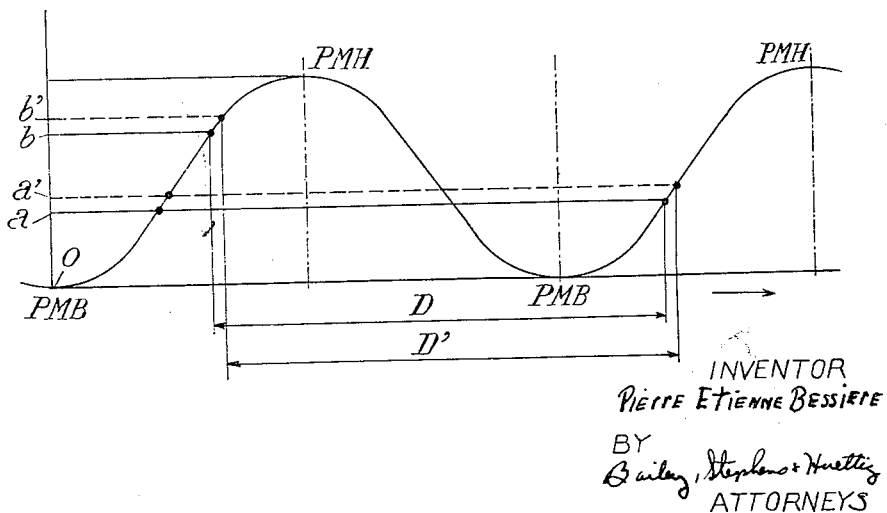

A preferred embodiment of my invention will be hereinafter described with reference to the appended drawings given merely by way of example and in which:

FIG. 1 diagrammatically shows, in axial section, a fuel injection pump comprising self regulation means according to my invention, self regulation, in this case, being obtained by means of the so called "liquid abutment" effect;

FIG. 2 is a curve illustrating the effect obtained according to the present invention.

The pump which will now be described may be used for the injection of fuel into engines of different kinds, such as explosion engines, gradual combustion engines of the diesel type, gas turbines and so on.

This fuel injection pump comprises a cylinder 1, in which reciprocates a piston 2 moving under the action of driving means (a cam or the like) not shown by the drawing. Said driving means are operated by the shaft of the engine on which the injection pump is mounted, so that the number of reciprocations per minute of piston 2 in its cylinder is proportional to the number of revolutions per minute of the engine shaft.

In the construction illustrated by FIG. 1 piston 2 has not only a reciprocating rectilinear movement in its cylinder 1, but also a movement of rotation about its axis (produced by means not shown in the drawing) in order to be able to act as a distribution valve which, during a cycle comprising a number of delivery strokes, sends the fuel delivered by the pump during each of these strokes successively through respective delivery conduits 3 (only one of which is shown in FIG. 1), each of these delivery conduits 3 comprising a check valve 4 and feeding the fuel to an injector (or group of injectors) mounted on one of the cylinders of a multi-cylinder engine. In order to place the respective delivery conduits 3 (which are distributed about the axis of cylinder 1) successively into communication with the working chamber of the pump, piston 2 is provided with a longitudinal groove 5 in its side wall, which groove, during every delivery stroke of the piston, places the working chamber of cylinder 1 into communication with one of the delivery conduits 3.

In order to file the working chamber of cylinder 1 with fuel between two successive delivery strokes, I provide in the wall of cylinder 1, a feed conduit 6 which, during the return strokes, or suction strokes, of piston 2, communicates with the working chamber of the pump through one of a plurality of longitudinal grooves 7, an annular groove 8, a transversal channel 9 and an axial channel 10. Grooves 7, the number of which is equal to the number of delivery conduit 3 and groove 8 are formed in the side wall of piston 2, whereas channels 9 and 10 are formed in said piston.

Concerning the means for regulating the delivery of the pump, they comprise a by-pass conduit 11, one of the ends of which opens into the working chamber of the pump at a point sufficiently high to be never stopped by piston 2, whereas the other end of conduit 11 opens into a cylinder 12 in which slidably mounted a regulating member 13, also called "shuttle." This shuttle 13 is in form of a slide valve in the side wall of which there is provided an annular groove 13a, formed between two bearing portions 13b and 13c. Bearing portion 13b serves to control an outlet 14, provided in the wall of cylinder 12. Groove 13a is made of a length such that by-pass conduit 11 always opens into that groove whatever be the position of shuttle 13, whereas by-pass conduit 11 communicates with outlet 14 through groove 13a only when the shuttle has moved from its position of rest indicated by FIG. 1 a given distance on its outward, or upward, strokes against the action of a return spring 15.

The self regulation means further comprises, for hydraulically driving shuttle 13 during its outward strokes an auxiliary pump working in synchronism with the main pump and serving to send a driving liquid into the bottom end of cylinder 12, under shuttle 13. This auxiliary pump comprises a piston 16 consisting of an enlarged portion of piston 2, this piston 16 cooperating with a cylinder 17 consisting of a bore in line with the main cylinder 1, but of an enlarged diameter.

An inlet conduit 18 opens into the auxiliary pump cylinder 17 at a level such that piston 16 closes this conduit 18 after it has moved a given distance on its outward strokes. After this inlet conduit 18 has been shut off, a liquid (which in the example of FIG. 1 consists of the fuel but might be of a different nature) is driven into cylinder 12, under shuttle 13 through one of the longitudinal grooves 19 provided in the side wall of auxiliary piston 16 and through a conduit 20 fitted with a check valve 21. During the return strokes of the whole of pistons 2 and 16, shuttle 13 is pushed back by spring 15 toward its position of rest where it is applied against an abutment 22. These return strokes of shuttle 13 are braked by the fact that the shuttle must drive back the liquid located under it through a conduit 23 extending between the bottom of cylinder 12 and cylinder 17 but which comprises a throttled passage 24 the cross section area of which is adjustable by a member 25 the control means for which are not shown by the drawing. Return flow of the liquid to cylinder 17 through conduit 20 is made impossible by the presence of check wall 21.

The self regulating pump above described operates as follows:

During every delivery stroke of pistons 2 and 16, shuttle 13 is lifted to a position where it opens the communication between by-pass conduit 11 and outlet 14, which immediately stops the delivery of fuel through the delivery conduit 3 which is then in communication with the main pump working chamber, thus stopping at the same time the injection of fuel into the corresponding engine cylinder.

When the number of revolutions per minute of the engine on which the pump is mounted and consequently the number of reciprocations per minute of pistons 2 and 16 exceeds a given value shuttle 13, due to the braking of its return strokes, no longer comes back to its position of rest before the beginning of next delivery stroke of auxiliary piston 16. In other words, the so called "liquid abutment" effect begins to take place. The strokes of the shuttle consequently become the shorter and the communication of the pump working chamber through bypass conduit 11 to outlet 14 takes place the earlier during the respective delivery strokes of piston 2 as said number of revolutions per minute more and exceeds said given value. The desired self regulation effect is thus obtained.

Said given number of revolutions per minute above which the so called "liquid abutment" effect begins to take place of course depends, for a given cross section area of throttled passage 24, upon the amount of liquid delivered by the piston 16 of the auxiliary pump on every delivery stroke, thereof to the space under shuttle 13 and upon the angular value of the "return period."

It has been found that these two factors may undergo undesirable variations in fuel injection pumps having only the above described characteristics. These undesirable variations are due to variations of the position of piston 16 with respect to its cylinder 17, into the wall of which inlet conduit 18 opens, these last mentioned variations producing variations of the relative time at which said piston 16 closes said inlet conduit 18.

When, for instance due to a thermal expansion of the pump body producing a displacement of the wall of cylinder 17 with respect to piston 16, or due to a mechanical compression between said piston and its driving cam, the closing of inlet conduit 18 is somewhat delayed, there is produced both a reduction of the amount of liquid delivered under shuttle 13 and increase of the angular value of the "return period." These two factors both act to produce an increase of the number of revolutions per minute above which the liquid abutment effect begins to take place and to reduce the amount of fuel injected on every stroke. Consequently the speed of the engine may become higher than the maximum that has been fixed.

In order to avoid this drawback and according to the main feature of the invention, I provide, in the wall of cylinder 17, or in an extension of this cylinder which may consist of the lower end of cylinder 1, a bypass conduit 26 which is placed in communication with cylinder 17 before piston 16 reaches the end of its delivery stroke, so that, as soon as this communication is made, the delivery of liquid by the auxiliary pump to the space under shuttle 13 stops.

Thus the amount of liquid delivered by the auxiliary pump to the space under shuttle 13 no longer depends upon the value (variable as a consequence of variations of the above mentioned factors) of the displacement of piston 16 between the time where it cuts off inlet conduit 18 and the time where it reaches the end of its upward stroke, but depends only upon the practically constant value of the axial distance between the respective openings of conduits 18 and 26 into auxiliary cylinder 17 or into an extension in this cylinder. Another effect of this arrangement is to make the angular value of "the return period" practically constant.

In the example of the invention illustrated by FIG. 1, by-pass conduit 26 opens into the bottom portion of cylinder 1, and I provide in the wall of the downward extension of piston 2, immediately above piston 16, an annular groove 27. Furthermore this groove is made of a height such that its upper edge comes to the level of the opening of conduit 26 into cylinder 1 before the whole of pistons 16 and 2 has reached the end of its upward stroke. Thus the communication between the inside of cylinder 17 and by-pass 26 is opened before the pistons reach their upper dead center position.

The effect obtained by this main feature of the invention is illustrated by the diagram of FIG. 2.

In this diagram the angles of rotation of the cam which drives pistons 16 and 2 are plotted in abscissas and the resulting axial displacement of said pistons are plotted in ordinates. The reference PMB corresponds to the time when the pistons are in their lower dead center position and the reference PMH corresponds to the times when the pistons are in their upper dead center position.

During the beginning of the upward movement of piston 16 starting from its lower position O this piston does not deliver liquid to the space under shuttle 13 as long as said piston has not reached point a which indicates the end of the portion of the upward movement of piston 16 necessary to close inlet conduit 18. When piston 16 moves on beyond this position, it delivers liquid to the space under shuttle 13 until it reaches point b where bypass conduit 26 begins to be opened. The amount of liquid delivered to the space under shuttle 13 is therefore proportional to the difference $Ob-Oa$. The end of the upward stroke of piston 13 takes place with by-pass conduit 26 open and therefore has no effect upon shuttle 13. The angular value of the return period of shuttle 13 begins at point $b$ and lasts until piston 16, in the course of its next upward stroke, again closes conduit 18 at point $a$. In the diagram of FIG. 2 this period is indicated by D. If, due for instance to terminal expansion, the body of the pump in which are formed conduits 18 and 26 moves with respect to piston 16, so that this piston closes inlet conduit 18, only after it has reached point $a'$, the opening of by-pass conduit 26 takes place only when piston 16 reaches, in the course of its upward stroke a position corresponding to $b'$. However the useful stroke $b'a'$ of piston 16, during which it has delivered liquid to the space under shuttle 13, has kept the same length since $b'b=a'a$. The amount of liquid delivered to the space under the shuttle is therefore unchanged. The same applies to the angular value of the "return period" $D'$ which now begins at $b'$ but extends to the time when the piston, in the course of its next upward stroke, reaches position $a'$. As a matter of fact $D'$ practically equal to D. Consequently the speed of the engine above which the "liquid abutment" effect begins to take place remains unchanged. The invention, therefore permits of directly controlling the inflow into cylinder 17 of the auxiliary pump by means of piston 16, without this direct control having a material increase upon the self regulation obtained by means of regulating number 13.

Of course the beginning and the end of the period for which the auxiliary piston delivers liquid to the space under the regulating number might be controlled not by axial movement of the auxiliary pump piston but by a movement of rotation of this piston about its axis, the piston being in this case provided with suitable control grooves, or with a part rotating simultaneously therewith or rotated in synchronism with the reciprocating movements of the auxiliary pump piston.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of accompanying claims.

What I claim is:

1. A self regulating reciprocating liquid pump which comprises, in combination, a main pump including a main cylinder and a main piston mounted reciprocating in said cylinder to form therewith a variable volume main working chamber, at least one liquid delivery conduit starting from said cylinder working chamber, a first by-pass conduit starting from said cylinder working chamber and having an outlet opening to the outside, a regulating valve member mounted to cooperate with said outlet to control the opening thereof, a housing surrounding a portion of said regulating member which is slidable therein in piston-like fashion, said housing and said regulating member portion forming together a variable volume space, said regulating member being arranged to open said by-pass conduit outlet when said member reaches a given position with respect to said housing on every displacement thereof in the direction for which the volume of said variable volume space is increasing, an auxiliary reciprocating pump operatively connected with said main pump to work in synchronism therewith, said auxiliary pump including an auxiliary cylinder and an auxiliary piston mounted reciprocating in said auxiliary cylinder to form therewith a variable volume auxiliary working chamber, the displacements of said auxiliary piston with respect to said auxiliary cylinder in the direction for which the volume of said auxiliary working chamber is reduced being called delivery strokes of said auxiliary piston, means between said auxiliary working chamber and said variable volume space for connecting them together during at least a portion of every delivery stroke of said auxiliary piston, whereby the volume of said variable volume space is then made to increase, resilient means connected with said regulating member for urging it in the direction for which said variable volume space is reduced, means, including a throttled passage, for varying the length of the displacements of said regulating member in one direction in response to variations of the speed of said member so as to ensure the regulating action of said member, an inlet conduit opening into said auxiliary working chamber, means operative by said auxiliary piston for cutting off said auxiliary working chamber from said inlet conduit for a given position of said auxiliary piston moving on the delivery strokes, at the beginning thereof, a second by-pass conduit leading to the outside, and means operative by said auxiliary piston for placing said second by-pass conduit in communication with said auxiliary working chamber for a given position of said auxiliary piston moving on its delivery strokes so that said auxiliary working chamber is placed in communication with said second by-pass conduit before said auxiliary piston has reached the end of said delivery strokes.

2. A self regulating reciprocating liquid pump which comprises, in combination, a main pump including a main cylinder and a main piston mounted reciprocating in said cylinder to form therewith a variable volume main working chamber, at least one liquid delivery conduit starting from said cylinder working chamber, a first by-pass conduit starting from said cylinder working chamber and having an outlet opening to the outside, a regulating valve member mounted to cooperate with said outlet to control the opening thereof, a housing surrounding a portion of said regulating member which is slidable therein in piston-like fashion, said housing and said regulating member, portion forming together a variable volume space, said regulating member being arranged to open said by-pass conduit outlet when said member reaches a given position with respect to said housing on every displacement thereof in the direction for which the volume of said variable volume space is increasing, an auxiliary reciprocating pump operatively connected with said main pump to work in synchronism therewith, said auxiliary pump including an auxiliary cylinder and an auxiliary piston mounted reciprocating in said auxiliary cylinder to form therewith a variable volume auxiliary working chamber, the displacements of said auxiliary piston with respect to said auxiliary cylinder in the direction for which the volume of said auxiliary working chamber is reduced being called delivery strokes of said auxiliary piston, means between said auxiliary working chamber and said variable volume space for connecting them together during at least a portion of every delivery stroke of said auxiliary piston, whereby the volume of said variable volume space is then made to increase, resilient means connected with said regulating member for urging it in the direction for which said variable volume space is reduced, means, including a throttled passage, for braking the displacements of said regulating member in the last mentioned direction so as to ensure the regulating action of said member, an inlet conduit opening into said auxiliary working chamber, means operative by said auxiliary piston for cutting off said auxiliary working chamber from said inlet conduit for a given position of said auxiliary piston moving on its delivery strokes, at the beginnings thereof, a second by-pass conduit leading to the outside, and means operative by said auxiliary piston for placing said second by-pass conduit in communication with said auxiliary working chamber for a given position of said auxiliary piston moving on its delivery strokes so that said auxiliary working chamber is placed in communication with said second by-pass conduit, before said auxiliary piston has reached the end of said delivery strokes.

3. A pump according to claim 1 wherein said main cylinder and said auxiliary cylinder are in line with each other, said auxiliary cylinder being of a diameter greater than that of said main cylinder, and said main piston comprises an extension at the end of which is located the auxiliary cylinder, which is integral therewith, said extension fitting slidably in said main cylinder, said extension being provided with an annular groove located just above said auxiliary cylinder, said second by-pass conduit opening into the portion of said main cylinder wall where said groove is located when said auxiliary cylinder is nearing the end of each of its delivery strokes, the means by which said auxiliary working chamber is cut off from said inlet conduit consisting of the edge of said auxiliary piston and the means by which said second by-pass conduit is placed in communication with said auxiliary working chamber consisting of said annular groove.

References Cited in the file of this patent

UNITED STATES PATENTS 2,612,842  Steven ------------------ Oct. 7, 1952

FOREIGN PATENTS 1,234,133  France ------------------ May 16, 1960